US006816415B2

(12) United States Patent
Nakajima et al.

(10) Patent No.: US 6,816,415 B2
(45) Date of Patent: Nov. 9, 2004

(54) ADDITIONAL INFORMATION READ/WRITE SYSTEM, ADDITIONAL INFORMATION READ/WRITE METHOD, ADDITIONAL INFORMATION READ/WRITE PROGRAM, COMPUTER-READABLE PROGRAM STORAGE MEDIUM STORING ADDITIONAL INFORMATION READ/WRITE PROGRAM, AND ID/ADDITIONAL INFORMATION DISTRIBUTING APPARATUS.

(75) Inventors: Koichi Nakajima, Chiba (JP); Yoriaki Kanada, Kanagawa (JP); Akie Sugiyama, Kanagawa (JP); Toru Aida, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/361,829

(22) Filed: Feb. 11, 2003

(65) Prior Publication Data

US 2003/0179606 A1 Sep. 25, 2003

(30) Foreign Application Priority Data

Feb. 14, 2002 (JP) ..................................... P2002-036918

(51) Int. Cl.[7] .............................................. G11C 16/04
(52) U.S. Cl. .................................. 365/189.01; 365/215
(58) Field of Search ........................... 365/189.01, 215, 365/198, 234, 230.06; 705/50

(56) References Cited

U.S. PATENT DOCUMENTS 5,471,424 A * 11/1995 Takada et al. ......... 365/189.01
2003/0152009 A1    8/2003 Usui et al.

FOREIGN PATENT DOCUMENTS

WO    WO 02/101733 A1    12/2002

* cited by examiner

Primary Examiner—David Lam
(74) Attorney, Agent, or Firm—Rader, Fishman & Grauer PLLC; Ronald P. Kananen

(57) ABSTRACT

An additional information read/write system has an ID/additional information distributing apparatus, an ID postscribing apparatus, and a drive system. The ID/additional information distributing apparatus includes a managing unit for managing IDs postscribed to optical discs and additional information for updating content read from each of the optical discs and a distributing unit for distributing the IDs and the additional information corresponding to the IDs. The ID postscribing apparatus includes a transmitting and receiving unit and a writing unit. The drive system includes a transmitting and receiving unit for transmitting the IDs to the ID/additional information distributing apparatus and receiving the additional information, a writing unit for writing the additional information on a storage medium, and a playback unit for playing back the content updated based on the additional information from the storage medium.

8 Claims, 9 Drawing Sheets

FIG. 2

|   | ID | USED |      | ID | USED |      | ID | USED |
|---|----|------|------|----|------|------|----|------|
| 1 | AA01C00001 | ● | 1001 | AA01C01001 | ● | 2001 | AA01C02001 | |
| 2 | AA01C00002 | ● | 1002 | AA01C01002 | ● | 2002 | AA01C02002 | |
| 3 | AA01C00003 | ● | 1003 | AA01C01003 |   | 2003 | AA01C02003 | |
| 4 | AA01C00004 | ● | 1004 | AA01C01004 |   | 2004 | AA01C02004 | |
| ... | ............ | ...... | ... | ............ | ...... | ... | ............ | ...... |

STORE A (STORE NUMBER: AA01, TITLE: C)

FIG. 3

|   | ID | USED |      | ID | USED |      | ID | USED |
|---|----|------|------|----|------|------|----|------|
| 1 | AB09F00001 | ● | 1001 | AB09F01001 | ● | 2001 | AB09F02001 | ● |
| 2 | AB09F00002 | ● | 1002 | AB09F01002 | ● | 2002 | AB09F02002 |   |
| 3 | AB09F00003 | ● | 1003 | AB09F01003 | ● | 2003 | AB09F02003 |   |
| 4 | AB09F00004 | ● | 1004 | AB09F01004 | ● | 2004 | AB09F02004 |   |
| ... | ............ | ....... | ... | ............ | ....... | ... | ............ | ....... |

STORE B (STORE NUMBER: AB09, TITLE: F)

FIG. 4

|   | ID | GAME CHARACTER | POWER | OFFENSIVE POWER | DEFENSIVE POWER |
|---|---|---|---|---|---|
| 1 | AA01C00001 | Character A | 1500 | 1000 | 5500 |
| 2 | AA01C00002 | Character B | 5000 | 3500 | 4000 |
| 3 | AA01C00003 | Character C | 3200 | 5000 | 1500 |
| ... | ............ | ............. | ....... | ....... | ....... |

FIG. 5

| | ID | SCENE |
|---|---|---|
| 1 | AA01C00001 | SCENE 1 |
| 2 | AA01C00002 | SCENE 2 |
| 3 | AA01C00003 | SCENE 3 |
| ... | ............ | ............ |

FIG. 6

| | ID | GAME CHARACTER | POWER | OFFENSIVE POWER | DEFENSIVE POWER |
|---|---|---|---|---|---|
| 1 | AA01C00000, AA01C00010, AA01C00020, AA01C00030, AA01C00040, ............ | Character A | 1500 | 1000 | 5500 |
| 2 | AA01C00001, AA01C00011, AA01C00021, AA01C00031, AA01C00041, ............ | Character B | 5000 | 3500 | 4000 |
| ... | ............ | ............ | ......... | ......... | ......... |
| 10 | AA01C00009, AA01C00019, AA01C00029, AA01C00039, AA01C00049, ............ | Character J | 3200 | 5000 | 1500 |

FIG. 7

| | LAST TWO DIGITS OF ID | APPEARANCE PROBABILITY | GAME CHARACTER | POWER | OFFENSIVE POWER | DEFENSIVE POWER |
|---|---|---|---|---|---|---|
| 1 | 1, 11, 21, 31, 41, 51, 61, 71, 81, 91 | 1/10 | Character A | 1500 | 1000 | 5500 |
| 2 | 55, 99 | 1/50 | Character B | 10000 | 5500 | 9000 |
| 3 | 5, 25, 45, 65, 85 | 1/20 | Character C | 3200 | 7000 | 1500 |
| 4 | 2, 12, 22, 32, 42, 52, 62, 72, 82, 92 | 1/10 | Character D | 4000 | 2500 | 2500 |
| ... | ............ | ........ | ............... | ......... | ......... | ......... |
| 23 | 3, 13, 23, 33, 43, 53, 63, 73, 83, 93 | 1/10 | Character W | 2000 | 2000 | 3500 |
| 24 | 00 | 1/100 | Character X | 15000 | 10000 | 8000 |
| ... | ............ | ........ | ............... | ......... | ......... | ......... |

US 6,816,415 B2

ADDITIONAL INFORMATION READ/WRITE SYSTEM, ADDITIONAL INFORMATION READ/WRITE METHOD, ADDITIONAL INFORMATION READ/WRITE PROGRAM, COMPUTER-READABLE PROGRAM STORAGE MEDIUM STORING ADDITIONAL INFORMATION READ/WRITE PROGRAM, AND ID/ADDITIONAL INFORMATION DISTRIBUTING APPARATUS.

BACKGROUND OF THE INVENTION

1. Field of the Invention

The present invention relates to an additional information read/write system for reading and writing additional information, the system having a drive system for playing back content updated based on additional information provided from an ID/additional information distributing apparatus. It also relates to an additional information read/write method, an additional information read/write program, a computer-readable program storage medium storing the additional information read/write program, and the ID/additional information distributing apparatus for distributing identification numbers (IDs) (hereinafter referred to as IDs) and additional information.

2. Description of the Related Art

Various content data (hereinafter referred to as "content") stored in storage media, such as an optical disc, is distributed owing to the development of the information industry in recent years. Such content includes electronic data concerning literary works and electronic data concerning movies, music, and images. The content is played back by a drive system and displayed on a display in the drive system or audio-output by an audio output device. For example, when content having the same title is written on a plurality of known optical discs, the same content is played back from each of the optical discs. In other words, customers can enjoy only defined and undifferentiated content when the content having the same title is written on the known optical discs.

However, when the customer owns an optical disc having such defined and undifferentiated content with the same title as the content of optical discs owned by his/her friends, he/she can know the content of his/her optical disc from the information of his/her friend, thus losing his/her interest in the content. Furthermore, since the content having the same title contains the same data, a customer or a family commonly avoids purchasing a plurality of optical discs having the content with the same title.

SUMMARY OF THE INVENTION

Accordingly, it is an object of the present invention to provide an additional information read/write system, an additional information read/write method, an additional information read/write program, a computer-readable program storage medium storing the additional information read/write program, and an ID/additional information distributing apparatus, all of which can update content having the same title to stimulate a customer's desire to buy optical discs having the written content.

The present invention provides, in its first aspect, an additional information read/write system having an ID/additional information distributing apparatus, an ID postscribing apparatus, and a drive system. The ID/additional information distributing apparatus includes a managing unit for managing IDs to be postscribed to optical discs and additional information for updating content read from the each of the optical discs and a distributing unit for distributing the IDs and the additional information corresponding to the IDs. The ID postscribing apparatus includes a transmitting and receiving unit for requesting the IDs from the ID/additional information distributing apparatus to receive the IDs and a postscribing unit for postscribing the received IDs on the optical discs. The drive system includes a transmitting and receiving unit for transmitting the IDs read from the optical discs to the ID/additional information distributing apparatus and receiving the additional information distributed from the ID/additional information distributing apparatus, a writing unit for writing the received additional information on a storage medium, and a playback unit for playing back the content updated based on the additional information from the storage medium.

It is preferable that the content be a software game.

In such a case, partially different content can be played back from optical discs on which the same software game is written.

It is preferable that the additional information be concerned with new storylines that are partially substituted for old storylines of the software game.

In such a case, since old storylines of the software game are partially replaced with new storylines to update the content, the customer can enjoy the software games without being bored with them even when he/she has purchased a plurality of optical discs.

It is preferable that the additional information be concerned with a game character or a game-element image of the software game.

In such a case, since the game character and the game-element image can be updated, the customer can enjoy the software games without being bored with them even when he/she has purchased a plurality of optical discs.

The present invention provides, in its second aspect, an additional information read/write method including the steps of: postscribing an ID distributed from an ID/additional information distributing apparatus onto an optical disc, in an ID postscribing apparatus; reading the ID, in a drive system for playing back content from the optical disc having the ID; transmitting the ID to the ID/additional information distributing apparatus, in the drive system; distributing additional information for updating the content read from the optical disc, the additional information being managed per ID, to the drive system in association with the ID, in the ID/additional information distributing apparatus; storing the received additional information in a storage medium, the additional information being distributed from the ID/additional information distributing apparatus, in the drive system; and playing back the content updated based on the additional information read from the storage medium, in the drive system.

The present invention provides, in its third aspect, an additional information read/write program rendering an ID/additional information distributing apparatus to manage IDs to be postscribed to optical discs and additional information for updating content read from each of the optical discs and to distribute the IDs and the additional information corresponding to the IDs; rendering an ID postscribing apparatus to request the IDs from the ID/additional information distributing apparatus to receive the IDs, and to postscribe the received IDs on the optical disc; and rendering a drive system to transmit the IDs read from the optical discs to the ID/additional information distributing apparatus and receive the additional information distributed from the ID/additional information distributing apparatus and to play back the content updated based on the additional information read from a storage medium storing the received additional information.

The present invention provides, in its fourth aspect, a computer-readable program storage medium storing an additional information read/write program. The additional information read/write program renders an ID/additional information distributing apparatus to manage IDs to be postscribed to optical discs and additional information for updating content read from each of the optical discs and to distribute the IDs and the additional information corresponding to the IDs; renders an ID postscribing apparatus to request the IDs from the ID/additional information distributing apparatus to receive the IDs, and to postscribe the received IDs onto the optical disc; and renders a drive system to transmit the IDs read from the optical discs to the ID/additional information distributing apparatus and receive the additional information distributed from the ID/additional information distributing apparatus and to play back the content updated based on the additional information read from a storage medium storing the received additional information.

The present invention provides, in its fifth aspect, an ID/additional information distributing apparatus for distributing IDs to be postscribed to optical discs to an ID postscribing apparatus and for distributing additional information for updating content read from each of the optical discs to a drive system for playing back the content. The ID/additional information distributing apparatus has an ID/additional information management unit for managing the IDs postscribed to the optical disc and the additional information corresponding to the IDs and a distributing unit for distributing the IDs to the ID postscribing apparatus in response to a request from the ID postscribing apparatus and for distributing the additional information corresponding to the IDs read from each of the optical discs by the drive system to the drive system.

With such features of the present invention described above, the ID postscribing apparatus postscribes the IDs distributed from the ID/additional information distributing apparatus on the optical discs. Then, the drive system of the customer reads the IDs of the optical discs and sends the read IDs to the ID/additional information distributing apparatus. The ID/additional information distributing apparatus, which manages the additional information for updating the content read from each of the optical discs per ID, distributes the additional information to the drive system in association with the received IDs. The drive system receives the additional information distributed from the ID/additional information distributing apparatus and stores it in the storage medium. The drive system then plays back the content updated based on the additional information read from the storage medium.

The above and other objects, features, and advantages of the present invention will become clear from the following description of the preferred embodiments taken in conjunction with the accompanying drawings.

BRIEF DESCRIPTION OF THE DRAWINGS

FIG. 2 is a list showing an example of IDs;

FIG. 3 is a list showing another example of the IDs;

FIG. 4 is a list showing an example of additional information;

FIG. 5 is a list showing another example of the additional information;

FIG. 6 is a list showing another example of the additional information;

FIG. 7 is a list showing another example of the additional information;

DESCRIPTION OF THE PREFERRED EMBODIMENTS

Preferred embodiments of the present invention will now be described with reference to the attached drawings.

Although various technically desired restrictions are imposed on the preferred embodiments of the present invention described below, the scope of the present invention is not limited to those embodiments unless specifically described.

Figure 1:
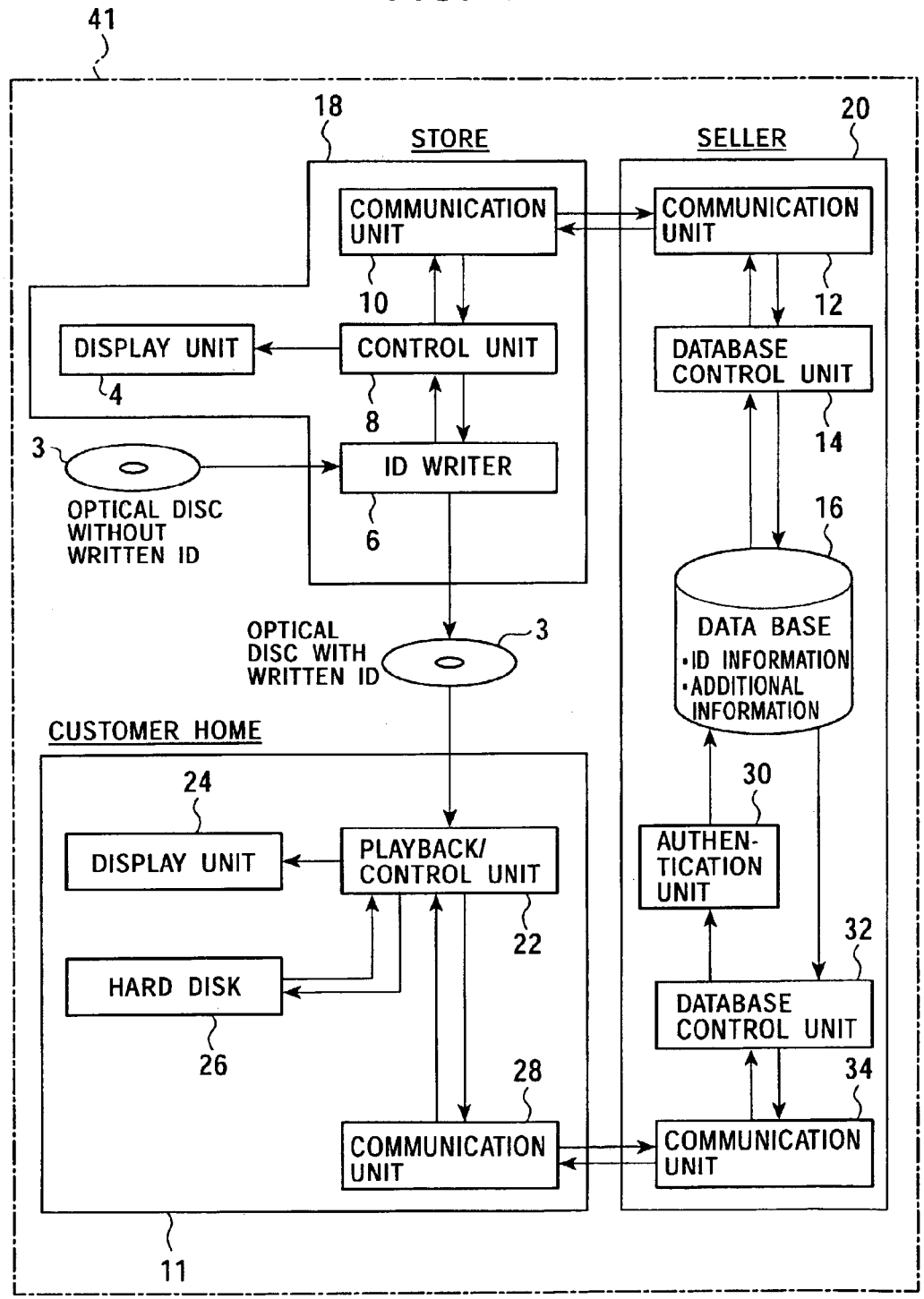
FIG. 1 is a block diagram showing the structure of an additional information read/write system including an optical disc according to an embodiment of the present invention.

FIG. 1 is a block diagram showing the structure of an additional information read/write system 41 including an optical disc 3 according to an embodiment of the present invention.

The additional information read/write system 41 includes at least a seller server 20 (ID/additional information distributing apparatus) and a store server 18 (ID postscribing apparatus) and also includes a drive system 11 owned by a customer. The additional information read/write system 41 supplies additional information to the drive system 11 with which the customer plays back content from the optical disc 3. The additional information updates the content, for example, played back by the drive system 11.

The store server 18 has a display unit 4, an ID writer 6, a control unit 8, and a communication unit 10 as software (ID writing program). All or part of the software may be replaced with hardware.

The optical disc 3 has predetermined content written on a program area and the content is played back by the drive system 11 of the customer. The optical disc 3 has an ID. The optical disc 3 may be one of the copies made by mass production.

The optical disc 3 is not limited to, for example, a read-only optical disc and may be a write-once-read-many optical disc having a recording area on which predetermined information can be written. For example, the optical disc 3 having the recording area may be a DVD (digital versatile disc: trade name) having a BCA (burst cutting area). Technologies for the optical disc 3 are also disclosed in Japanese Patent Application No. 2001-173781 and Japanese Patent Application No. 2001-269100. According to these technologies, information can be read with a typical ROM (read only memory) drive and written on a program area (recording area) of the ROM.

The content has already been written on the optical disc 3 and no additional information is written thereon. The additional information is written on an information storage medium, such as a hard disk 26, included in the drive system 11, as described in detail below. The additional information may regularly be written on a nonvolatile information storage medium or temporarily be written on a volatile information storage medium. The following description is a case that the content written on the optical disc 3 is a software game.

The control unit 8 determines whether the ID has been already written on the optical disc 3. The control unit 8 controls the ID writer 6 that writes the ID when the ID is not written on the optical disc 3.

The seller server 20 distributes a required number of IDs to the store server 18 when the IDs are requested from the store server 18. The seller server 20 also retrieves the additional information corresponding to the ID of the optical disc 3 owned by the customer when the additional information is requested from the customer and distributes the additional information to the drive system 11 of the customer.

The seller server 20 includes at least a database 16 and a communication unit 34 as software (additional information management program) and preferably includes a communication unit 12, a database control unit 14, an authentication unit 30, and a database control unit 32 as software (ID/additional information management program). All or part of the software may be replaced with hardware.

The communication unit 12 exchanges data with the communication unit 10 in the store server 18. The communication unit 34 exchanges data with a communication unit 28 in the drive system 11. The database control units 14 and 32 control data in the database 16; for example, they retrieve, update, add, and delete the data. The authentication unit 30 authenticates (the optical disc 3 of) the customer.

The database 16 manages the IDs and the additional information corresponding to the manufactured optical disc 3. The additional information can individualize optical discs (including the optical disc 3) that store the same content.

The database 16 may manage a plurality of parameters as the additional information for one ID, as shown in FIG. 4, or may manage different scenes as the additional information for IDs, as shown in FIG. 5. Specifically, the additional information is, for example, concerned with new storylines that are partially substituted for old storylines of the software game for IDs. In this case, since old storylines of the software game are partially replaced with new storylines to update the content, the customer having a plurality of optical discs 3 can enjoy the content without being bored with it.

The additional information may relate to game characters and game-element images. In such a case, since the game characters and the game-element images can be updated, the customer having a plurality of optical discs 3 can enjoy the content without being bored with it.

The drive system 11 includes at least the communication unit 28 and a playback/control unit 22 as software (additional information read/write program). It further includes the hard disk 26 and preferably includes a display unit 24.

The communication unit 28 exchanges data with the communication unit 34 in the seller server 20, as described above. The playback/control unit 22 controls the display unit 24, the hard disk 26, and the communication unit 28 and plays back content from the optical disc 3. It also reads the ID from the optical disc 3. The playback/control unit 22 may be regularly connected to a network (not shown) to always exchange information with it.

The playback/control unit 22 acquires the additional information through the communication unit 28 from, for example, the seller server 20 and stores it on the hard disk 26 serving as an information storage medium. The playback/control unit 22 updates the software game (content) written on the optical disc 3 based on the additional information read from the hard disk 26 and plays back the content. All or part of the components in the communication unit 28 and the playback/control unit 22 may be hardware instead of the software.

The display unit 24 displays the software game read from the optical disc 3 by the playback/control unit 22 in a predetermined manner. A liquid crystal display, an organic EL (electroluminescence), a CRT (cathode ray tube), or the like serves as the display unit 24.

FIGS. 2 to 6 show examples of IDs and additional information. The following description is a case that the additional information in FIGS. 4 to 6 is managed per ID in, for example, the database 16 in FIG. 1.

Referring to FIGS. 2 and 3, the IDs already written on the optical disc 3 by the control unit 8 is managed in the database 16, as described above. In other words, FIGS. 2 and 3 are lists showing as additional information whether or not the IDs of the optical discs 3, for example, sold in the respective store, are used. When the IDs of the sold optical discs 3 are used, black circles are written in "used" columns corresponding to the IDs already written on the sold optical discs 3. Such information concerning the use of the optical disc 3 is used for, for example, authentication by the authentication unit 30.

FIGS. 2 and 3 are exemplary lists of IDs allocated to stores. Here, for example, a store is identified with the first four letters of an ID, a title is identified with the following one letter, and the remaining five letters are used as a serial number, whereby allocating a unique number to each store or each title. The database 16 can determine which IDs have been already used based on, for example, marks put in the "used" columns.

Sufficient IDs may be sent to the store server 18 in advance. It is also possible that an ID is received from the seller server 20 each time the ID writer 6 is used after the optical disc 3 is purchased. With this method, a seller can know the number of purchases of the optical disc 3 in real time. This method can also bring to the seller server 20 such an advantage that the amount of net sales per store, the amount of sales per title, and the like can be figured out in real time. Since such information is distributed in real time, it is possible for the seller server 20 to plan a sales strategy.

The use of the additional information may allow the game characters of the content to be updated in various ways, as shown in FIG. 4.

The additional information may be concerned with scenes that are partially replaced with other scenes in content to update the content, as shown in FIG. 5.

The additional information may be concerned with game characters, as shown in FIG. 6. In such a case, the game characters having the same power, offensive power, and defensive power appear in the software game when they have the IDs of the same last number.

The game characters or the game-element images appearing in content may be weighted in accordance with their appearance probability with the additional information, as shown in FIG. 7. In this case, the game characters at a premium (having low appearance probability) can be created, thus increasing the commercial value of the optical disc 3 having the content written. The customer can enjoy various game characters.

An exemplary behavior of the additional information read/write system 41 having the structure described above (one example of the additional information read/write method) will now be described with reference to FIGS. 1 to 7.

Figure 8:
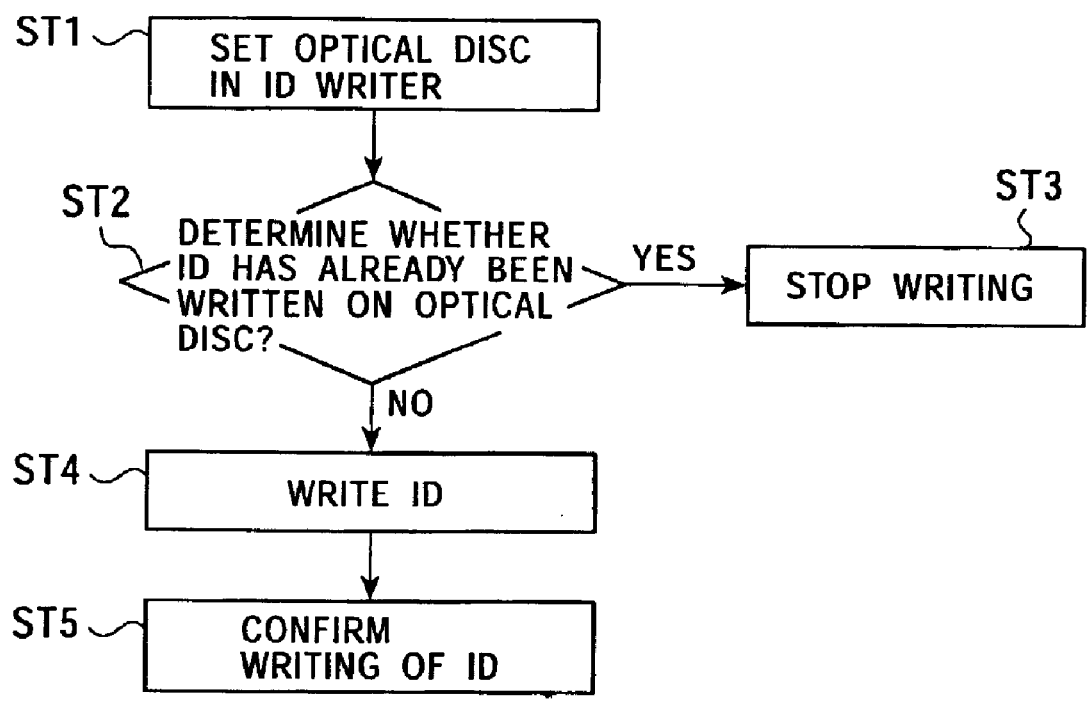
FIG. 8 is a flowchart showing a process of writing an ID on an optical disc.

FIG. 8 is a flowchart showing a process of writing an ID on the optical disc 3.

In Step ST1, the process sets the optical disc 3 without a written ID in the ID writer 6. In Step ST2, the process determines whether the ID has already been written on the optical disc 3. When the determination result is affirmative, writing of the ID is stopped in Step ST3. When the determination result is negative, in Step ST4, the process writes the ID on, for example, the recording area of the optical disc 3. In Step ST5, the process confirms the ID written on the optical disc 3. In this manner, the optical disc 3 purchased by a customer is given the ID at a store.

The ID may be written in advance at an optical disc factory instead of being written at the time of purchasing the optical disc 3. Furthermore, providing the drive system 11 or a set-top box having the similar function to the drive system 11 with an ID writing function allows, for example, the customer to write the ID on the optical disc 3.

Issuance and management of the ID written on the optical disc 3 will now be described.

The store server 18 is connected to the seller server 20 through a network (not shown). The communication unit 10 in the store server 18 exchanges data with the communication unit 12 in the seller server 20. The store server 18 can, for example, receive the ID to be postscribed to the optical disc 3 from the seller server 20. In other words, the seller server 20 manages the ID given to the optical disc 3 such that the ID is not duplicated and issues an ID in response to the request from the store server 18.

The store server 18 has a sufficient number of IDs allocated in advance. When the number of IDs falls short, the store server 18 requests additional IDs from the seller server 20 through the network (not shown).

A exemplary process after a customer plays back the optical disc 3 will now be described.

Figure 9:
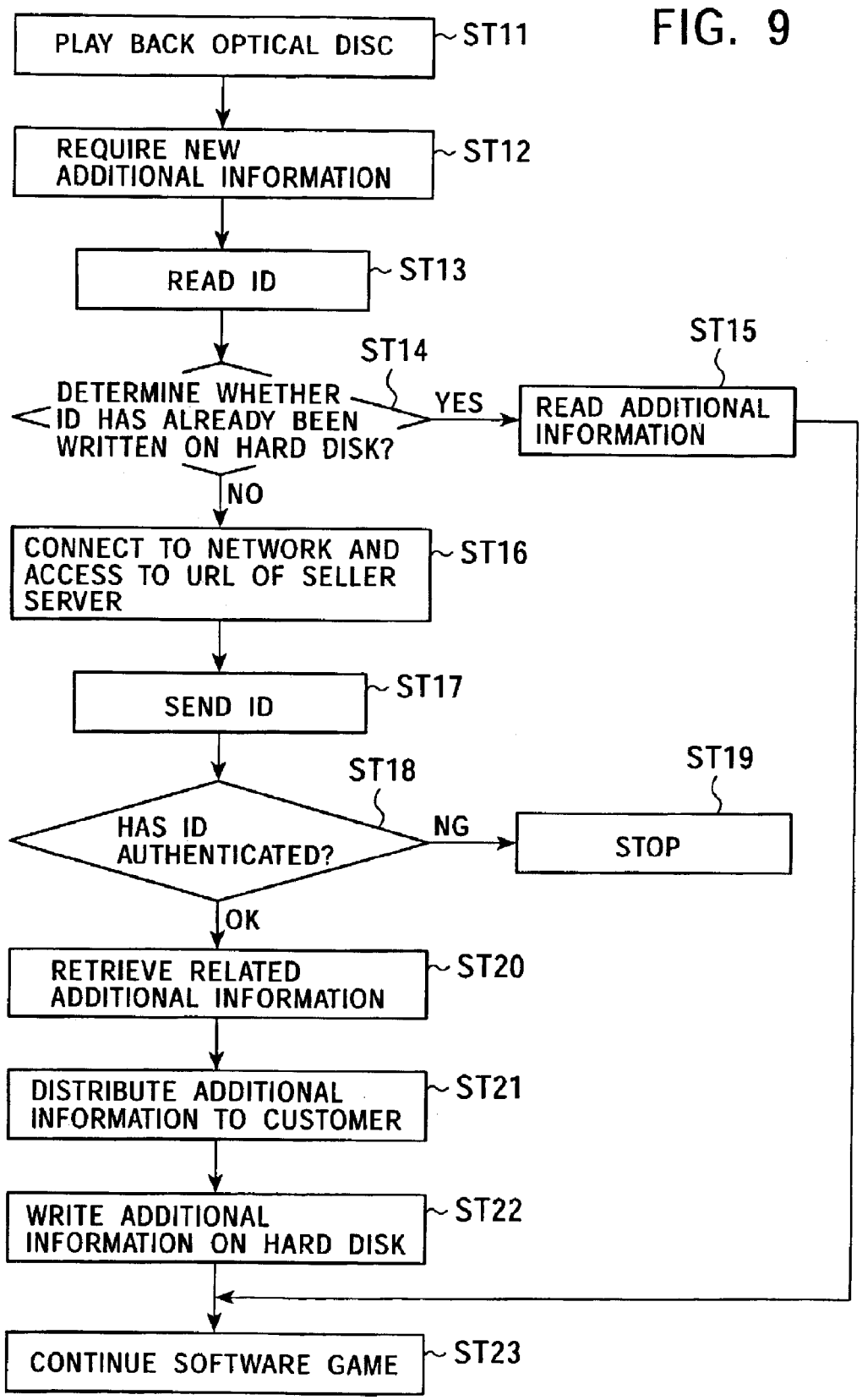
FIG. 9 is a flowchart showing a process after content on the optical disc is played back.

FIG. 9 is a flowchart showing a process after the customer plays back the content on the optical disc 3. The following description is a case that the content written on the optical disc is a software game.

In Step ST11, the customer plays back the purchased optical disc 3 with the drive system 11 that accesses the content on the optical disc 3. Specifically, the drive system 11 is, for example, a personal computer and plays back the optical disc 3 purchased by the customer to run the software game. The drive system 11 is not limited to a personal computer and it may be a game machine connectable to a network (not shown) or an electronic apparatus such as a set-top box.

In Step ST12, the process requires new additional information when, for example, the software game begins or proceeds to one scene. The additional information here may introduce a new game character or may develop a new scene.

In Step ST13, the drive system 11 reads an ID on the optical disc 3. In Step ST14, the process determines whether additional information has already been written on, for example, the hard disk 26. When the determination result is affirmative, the drive system 11 reads the additional information from the hard disk 26, and updates the software game based on the additional information and continues the software game in Step ST15.

When the determination result in Step 14 is negative, the drive system 11 automatically connects to a network (not shown) with the communication unit 28 and accesses to an URL (uniform resource locator) of, for example, the seller server 20 of the content in Step ST16.

In Step ST17, the drive system 11 sends the ID of the optical disc 3 to the seller server 20 through a network (not shown) in response to the request from, for example, the seller server 20. In Step ST18, the seller server 20 authenticates the ID sent from the drive system 11 with the authentication unit 30.

When the ID is not authenticated, the process stops after, for example, issuing an error message in Step ST19. When the ID is authenticated by the authentication unit 30 in Step ST18, the seller server 20 retrieves the related additional information corresponding to the ID from the database 16 that manages the additional information in Step ST20.

In Step ST21, the process distributes the retrieved additional information to the drive system 11 of the customer through the network (not shown). In Step ST22, the process writes the additional information on the hard disk 26 and, in Step ST23, it continues the software game.

A completely different additional information may be provided per ID. In this case, one game character or one scene is allocated to an ID, as shown in FIGS. 4 and 5. Since each game character has a different characteristic (for example, differs in power from other game characters), the customer enjoys the software game contributable to various game characters. When one scene is allocated to an ID, the customer enjoys a different storyline per disc even when optical discs have the same title.

A limited amount of additional information may be provided. Specifically, ten game characters may be specified with the last numbers of IDs varying from 0 to 9 as additional information, as shown in FIG. 6. In such a case, the same game character is allocated to IDs having the same last number. Furthermore, game characters may be weighted in accordance with their appearance probability with the additional information, as shown in FIG. 7. In other words, game characters or game-element images that rarely appear in a software game or those that appear at a certain frequency can be created with the additional information.

As described above, according to the embodiments of the present invention, providing a different game character per optical disc or providing a game character at a premium by varying the appearance probability of game characters can stimulate a desire of a user to possess optical discs. As a result, sales promotion in the form of inducing one user to purchase a plurality of optical discs having the same title can be realized.

The additional information does not necessarily need to be written on a hard disk or the like and it may be received via always-on connections these days since broadband systems are in widespread use. Although the ID is written at the store server 18 in the above embodiments, it may be written in advance at an optical disc factory. The customer may write the ID on the optical disc 3 on an individual basis in such a state that the optical disc 3 is managed in a predetermined manner so not to have duplicated IDs.

According to the embodiments of the present invention, different data can be played back per optical disc even when optical discs 3 have the content having the same title, thereby individualizing each optical disc. Accordingly, since a plurality of optical discs 3 having the content with the same title has different data, it can offer more pleasure to customers. Furthermore, this can stimulate customer's desire to buy optical discs 3, thus inducing one customer to buy a plurality of optical discs 3 having the content with the same title, thereby promoting sales of the optical discs 3.

The present invention is not limited to the embodiments described above.

When the drive system 11 is a game machine or the like other than a personal computer, removable storage media such as a memory card, CD-R/RW, DVD±R/RW/RAM may be substituted for the hard disk 26 in the drive system 11.

Program storage media for installing the program that executes a series of processing described above in a computer and causing it to be executed by the computer may be not only package media, such as a flexible disk (for example, a floppy disk (registered trademark)), a CD-ROM (compact disc read only memory), and a DVD (digital versatile disc), but also a semiconductor memory or a magnetic disc that temporarily or permanently stores programs.

Means for storing the programs in such program storage media may be wired and wireless communication media, such as a local area network, the Internet, or digital satellite broadcasting. The programs may be stored via various communication interfaces, such as a router or a modem.

The additional information read/write system 41 described above may have a drive system that can at least read data, such as programs, on the program storage media. The programs are not limited to be stored in the program storage media and may be provided by data communication over a variety of communication means such as the Internet.

Structures according to the embodiments of the present invention may be partially omitted or arbitrarily combined with each other in a different manner from the above description.

What is claimed is:

1. An additional information read/write system comprising:
   an ID/additional information distributing apparatus including:
     a managing unit for managing identification numbers (IDs) to be postscribed to optical discs and additional information for updating content read from each of the optical discs; and
     a distributing unit for distributing the IDs and the additional information corresponding to the IDs;
   an ID postscribing apparatus including:
     a transmitting and receiving unit for requesting the IDs from the ID/additional information distributing apparatus to receive the IDs; and
     a postscribing unit for postscribing the received IDs on the optical discs; and
   a drive system including:
     a transmitting and receiving unit for transmitting the IDs read from the optical discs to the ID/additional information distributing apparatus and receiving the additional information distributed from the ID/additional information distributing apparatus;
     a writing unit for writing the received additional information on a storage medium; and
     a playback unit for playing back the content updated based on the additional information from the storage medium.

2. An additional information read/write system according to claim 1, wherein the content is a software game.

3. An additional information read/write system according to claim 1, wherein the additional information is concerned with new storylines that are partially substituted for old storylines of the software game.

4. An additional information read/write system according to claim 1, wherein the additional information is concerned with a game character or a game-element image of the software game.

5. An additional information read/write method comprising the steps of:
   postscribing an ID distributed from an ID/additional information distributing apparatus onto an optical disc, in an ID postscribing apparatus;
   reading the ID, in a drive system for playing back content from the optical disc having the ID;
   transmitting the ID to the ID/additional information distributing apparatus, in the drive system;
   distributing additional information for updating the content read from the optical disc, the additional information being managed per ID, to the drive system in association with the ID, in the ID/additional information distributing apparatus;
   storing the received additional information in a storage medium, the additional information being distributed from the ID/additional information distributing apparatus, in the drive system; and
   playing back the content updated based on the additional information read from the storage medium, in the drive system.

6. An additional information read/write program rendering:
   an ID/additional information distributing apparatus to manage IDs to be postscribed to optical discs and additional information for updating content read from each of the optical discs and to distribute the IDs and the additional information corresponding to the IDs;
   an ID postscribing apparatus to request the IDs from the ID/additional information distributing apparatus to receive the IDs, and to postscribe the received IDs on the optical discs; and
   a drive system to transmit the IDs read from the optical discs to the ID/additional information distributing apparatus and receive the additional information distributed from the ID/additional information distributing apparatus and to play back the content updated based on the additional information read from a storage medium storing the received additional information.

7. A computer-readable program storage medium storing an additional information read/write program rendering:
   an ID/additional information distributing apparatus to manage IDs to be postscribed to optical discs and additional information for updating content read from each of the optical discs and to distribute the IDs and the additional information corresponding to the IDs;
   an ID postscribing apparatus to request the IDs from the ID/additional information distributing apparatus to receive the IDs, and to postscribe the received IDs on the optical discs; and
   a drive system to transmit the IDs read from the optical discs to the ID/additional information distributing apparatus and receive the additional information distributed from the ID/additional information distributing apparatus and to play back the content updated based on the additional information read from a storage medium storing the received additional information.

8. An ID/additional information distributing apparatus for distributing IDs to be postscribed to optical discs to an ID postscribing apparatus and for distributing additional information for updating content read from each of the optical discs to a drive system for playing back the content, the ID/additional information distributing apparatus comprising:

an ID/additional information management unit for managing the IDs postscribed to the optical discs and the additional information corresponding to the IDs; and a distributing unit for distributing the IDs to the ID postscribing apparatus in response to a request from the ID postscribing apparatus and for distributing the additional information corresponding to the IDs read from the optical discs by the drive system to the drive system.

* * * * *